United States Patent [19]
Allen et al.

[11] 3,999,582
[45] Dec. 28, 1976

[54] METHOD AND APPARATUS FOR PROCESSING AND HARVESTING TREES

[76] Inventors: Charles A. Allen, P.O. Box 6706, Savannah, Ga. 31405; Walter Jarck, 306 Grady Drive, Rock Hill, S.C. 29730

[22] Filed: June 4, 1975

[21] Appl. No.: 583,677

[52] U.S. Cl. .............................. 144/3 D; 144/2 Z; 144/34 E; 144/309 AC
[51] Int. Cl.² ........................................ A01G 23/08
[58] Field of Search ................ 144/2 Z, 3 D, 34 R, 144/34 E, 309 AC; 83/928

[56] References Cited
UNITED STATES PATENTS

| | | | |
|---|---|---|---|
| 3,461,928 | 8/1969 | Siiro | 144/34 R X |
| 3,498,350 | 3/1970 | Maradyn | 144/309 AC |
| 3,797,539 | 3/1974 | Moser et al. | 144/3 D |
| 3,797,541 | 3/1974 | Kurelek et al. | 144/3 D |

*Primary Examiner*—Robert Louis Spruill
*Assistant Examiner*—W. D. Bray
*Attorney, Agent, or Firm*—Bell, Seltzer, Park & Gibson

[57] ABSTRACT

A method and apparatus for processing and harvesting trees in which the stem of a tree is encircled by instrumentalities mounted on an elongate member positioned adjacent the stem and the upper portion of the stem then exerts leverage about a fulcrum defined by the encircling instrumentalities to bias a butt end portion of the stem upwardly into engagement with an overlying guide mounted on the member adjacent cutting instrumentalities. Tree stems are processed by being advanced relative to the elongate member toward an automotive vehicle from which the elongate member is supported, while maintaining upward biasing of the stem into engagement with the overlying guide. The tree stem may be processed either into longwood or into shortwood sticks, with the processing beginning either from a growing tree which is harvested in accordance with this invention or from a previously felled stem which is lying on the ground.

14 Claims, 7 Drawing Figures

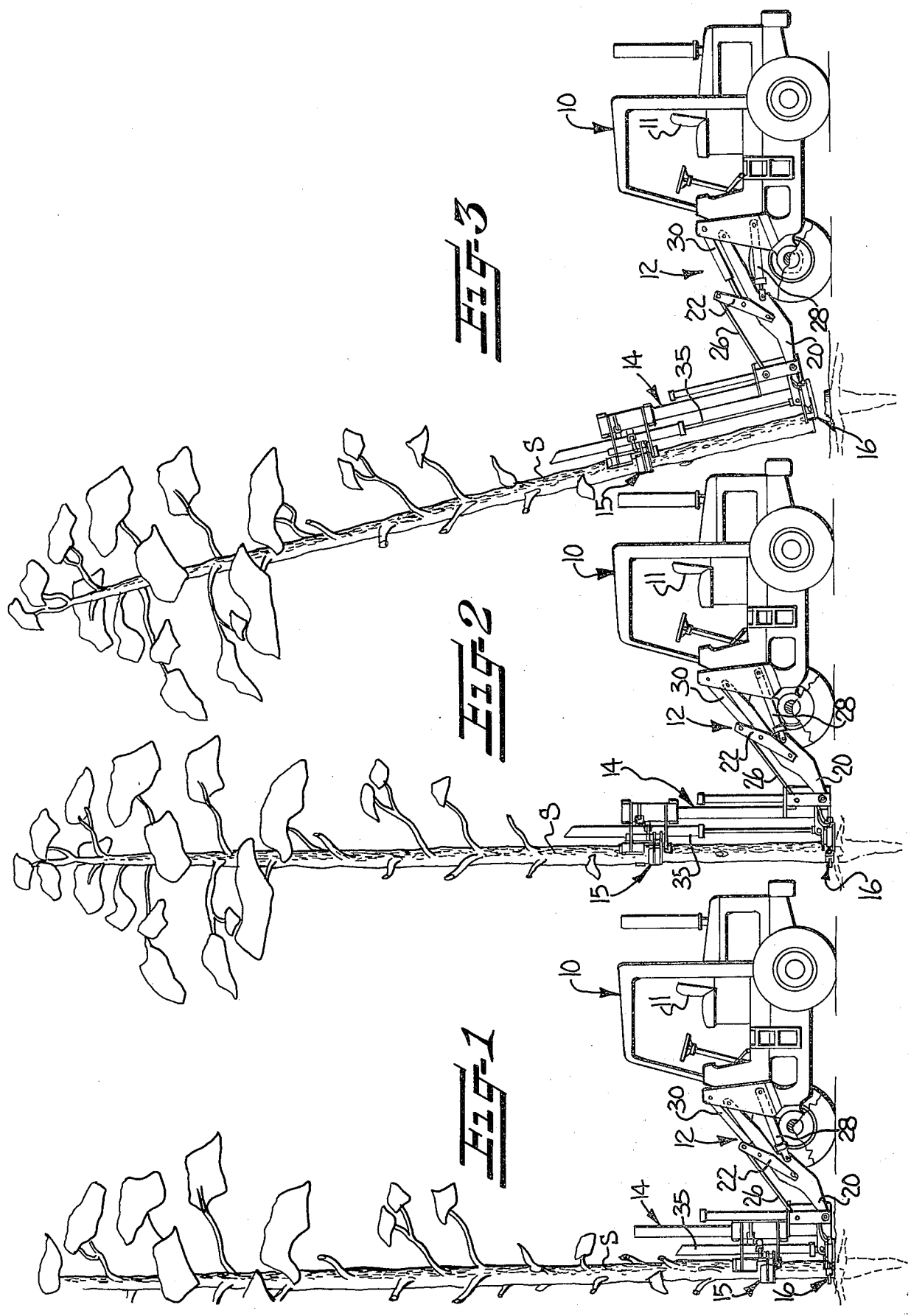

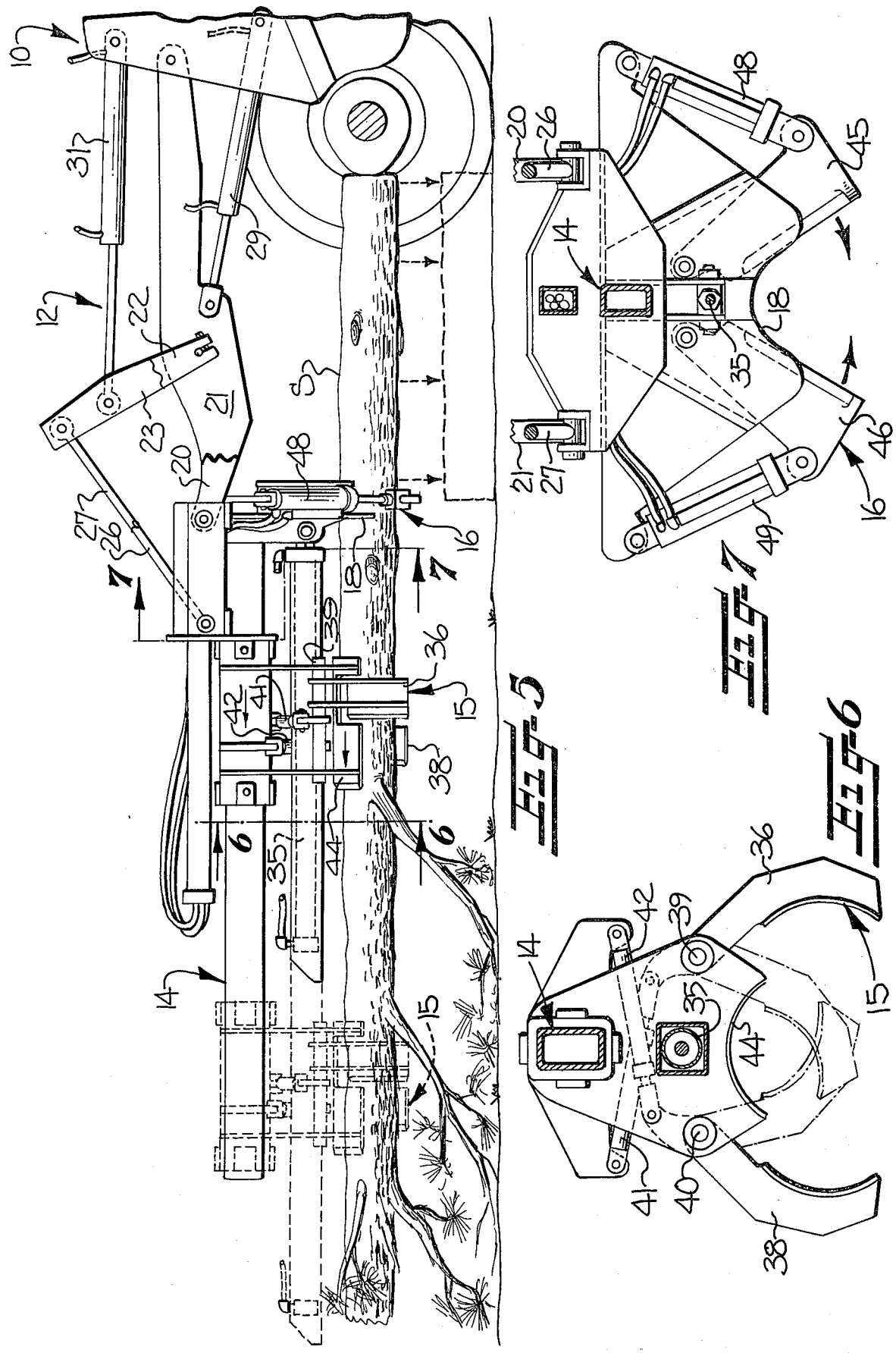

METHOD AND APPARATUS FOR PROCESSING AND HARVESTING TREES

Present consumption of forest products begins in the field with the harvesting and processing of standing timber or trees into one of two types of initial product, referred to here as "shortwood sticks" and "longwood". Shortwood sticks conventionally are relatively short lengths of tree stem, on the order of 4 to 10 feet, such as would be used by a paper mill or the like. Longwood conventionally is substantially the entire length of a tree stem, such as would be used for utility poles or the like. These two types of initial product have influenced the prior development of methods and apparatus for processing and harvesting trees, in that one or the other product is favored by particular apparatus and methods.

Regardless of the product favored, previously proposed methods and apparatus have been subject to certain difficulties and deficiencies. First, most previously proposed apparatus and methods are compatible with the harvesting of growing trees and immediate processing of such trees but are not capable of accommodating both harvesting and immediate processing and the processing of previously felled trees which may be lying on the ground. Accordingly, the operating practices of users of the apparatus and methods are restricted to those compatible with equipment available to the operator. Further, prior methods and apparatus frequently expose operators to unnecessary and unacceptable danger, as by failing to positively control positioning and movement of a tree stem or dropping severed limbs or stem tops onto an operator.

With the aforementioned difficulties particularly in mind, it is an object of this invention to accommodate, alternatively: harvesting of growing trees and immediate processing of a harvested tree, and processing of a previously felled tree. In realizing this object of the present invention, an elongate member is provided which is mounted for positioning adjacent the stem of a growing tree or adjacent the stem of a previously felled tree, for engagement with and subsequent processing of the tree stem.

Yet a further object of this invention is to positively control a tree stem during processing thereof. In accomplishing this object of the present invention, a stem is encircled intermediate the height thereof with instrumentalities mounted on an elongate member, the member is moved to a position in which the member overlies the stem, and a portion of the stem adjacent the cutting instrumentalities is biased upwardly into engagement with an overlying guide on the elongate member adjacent the cutting instrumentalities by exerting with the upper portion of the stem leverage about a fulcrum defined by the encircling instrumentalities. Such use of the stem in exerting leverage assures continuing engagement and guidance of the stem during processing, in distinction from previously proposed method and apparatus.

Yet a further object of this invention is to accomplish alternative processing of a tree stem into shortwood sticks and into longwood while accommodating observation of the processing of the tree stem by an operator. In realizing this object of the present invention, a stem which is held in underlying relation to an elongate member and guided in longitudinal movement relative to the elongate member is moved incrementally toward an operator and in full view of the operator. The operator has the choice of severing the tree stem during such intermediate movement, to process shortwood sticks, or permitting the stem to be advanced beneath an automotive vehicle from which the elongate member is mounted, to process longwood. By operating in the manner contemplated by this object of the present invention, limbs removed from the stem during processing are dropped forwardly of the operator and present no danger of falling on the operator, while the product of the processing of the tree stem is placed on the ground beneath or closely adjacent the automotive vehicle.

Some of the objects of this invention having been set forth above, other objects and advantages of the invention will appear as the description of the invention proceeds, when taken in conjunction with the following drawings, in which FIG. 1 is a side elevation view of an apparatus in accordance with the present invention, showing a first step in one method in accordance with the present invention wherein the stem of a growing tree is being prepared for harvesting;

FIG. 2 is a view similar to FIG. 1, showing an initial delimbing of a portion of the stem of the tree;

FIG. 3 is a view similar to FIGS. 1 and 2, showing controlled movement of a severed tree stem toward a position underlying an elongate member and for subsequent processing;

FIG. 5 is an enlarged side elevation view illustrating the processing of a tree stem by the apparatus of FIG. 4;

FIG. 6 is an enlarged view, partially in section, taken generally along the line 6—6 in FIG. 5; and FIG. 7 is a view similar to FIG. 6, taken generally along the line 7—7 in FIG. 5.

Figure 4:
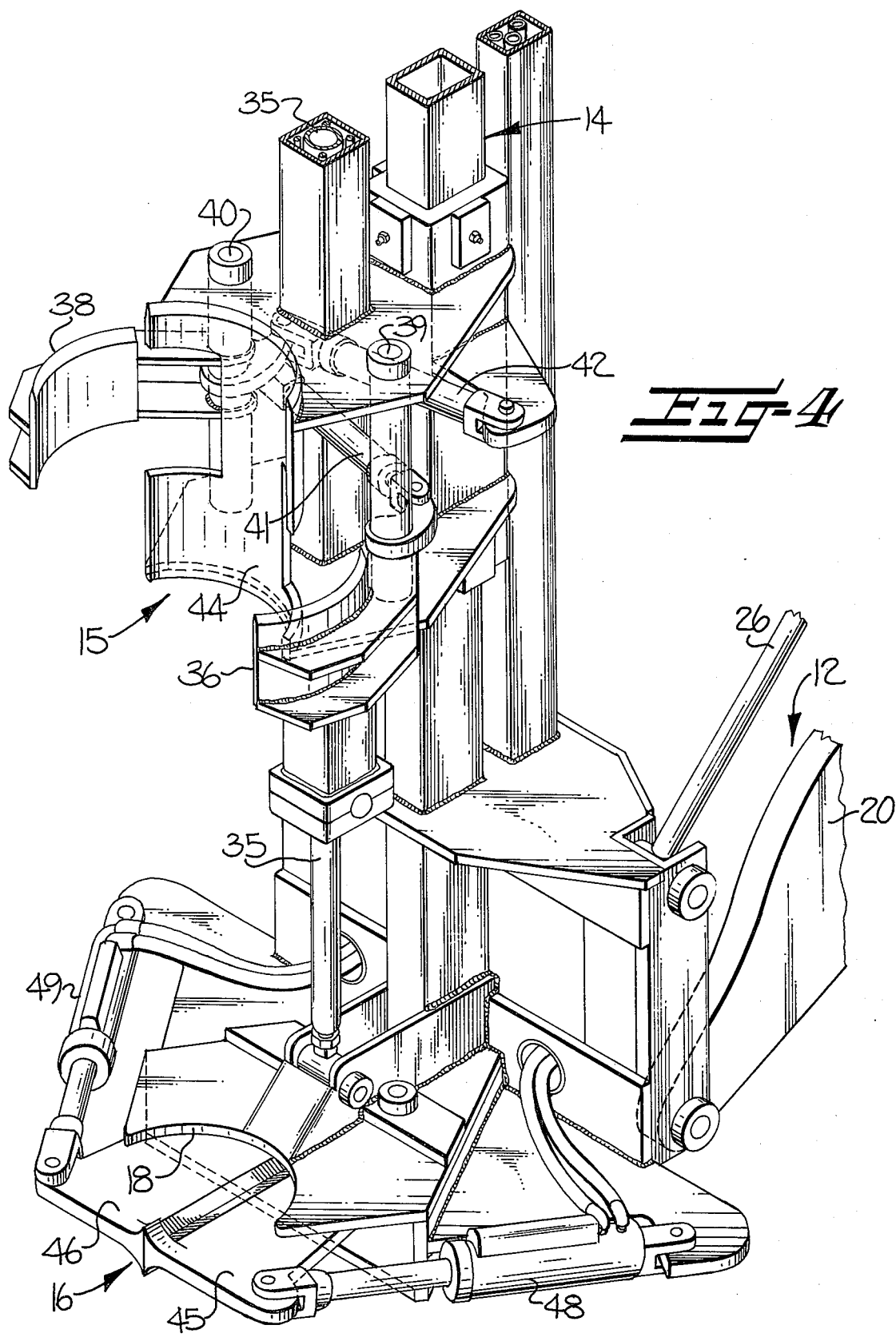
FIG. 4 is an enlarged perspective view of a portion of the apparatus of FIGS. 1 – 3, particularly illustrating stem encircling instrumentalities and cutting instrumentalities mounted on an elongate member.

While the method and apparatus of this invention will be described more particularly hereinafter with reference to the accompanying drawings, it is to be noted at the outset of this decription that the description and drawings are intended to make clear the best mode contemplated for this invention at the time the description and drawings were prepared. It is contemplated that persons familiar with the harvesting and processing of trees and timber will be aware of adaptations of the principles of this invention and that a person skilled in the art will be enabled by the description and drawings to practice the invention in modified forms. For this reason, the description and drawings are to be understood broadly and are not to be understood as limiting upon the scope of this invention.

Referring now more particularly to the drawings, the apparatus contemplated by this invention may be operated either as a tree harvester and processor or as a tree processor, as will be described more fully hereinafter. In either instance, the apparatus includes an automotive vehicle generally indicated at 10 which accommodates movement of the apparatus as required. In the form illustrated, the automotive vehicle 10 is an articulated frame, rubber tired vehicle having an operator's seat 11 disposed medially of the width and of the length of the vehicle. Extending forwardly of the vehicle 10 and of the operator's seat 11 are mounting means generally indicated at 12 such as appropriate linkage members described more fully hereinafter. The mounting means supports from and forwardly of the automotive vehicle 10 an elongate member 14 and moves the elongate member 14 relative to the automotive vehicle 10 to and from an overlying position (FIG. 5) during handling of a tree stem S.

Mounted on the elongate member 14 for cooperation as described hereinafter are stem encircling means generally indicated at 15 and more particularly shown in FIGS. 4 through 6, and cutting instrumentalities generally indicated at 16 and more particularly shown in FIGS. 4, 5 and 7.

In accordance with an important feature of this invention, a guide means in the form of a plate member 18 (FIGS. 5 and 7) is mounted on the elongate member 14 intermediate the cutting instrumentalities 16 and the encircling means 15 and preferably closely adjacent the cutting instrumentalities. During operation of the apparatus, as described more fully hereinafter, the encircling means 15 defines a fulcrum about which a severed tree stem S acts as a lever while the mounting means 12 maintains the elongate member 14 in position overlying the tree stem, so that the weight of an upper portion of the stem biases a portion of the stem adjacent the cutting instrumentalities 16 into engagement with the overlying guide 18. In such operation, a severed tree stem being processed is fully controlled during processing, in distinction from prior machines in which the tree stem acts as a lever attempting to remove the tree stem from cutting instrumentalities.

Turning now to a more detailed description of components of the apparatus in accordance with this invention, the mounting means 12 preferably comprises linkage means such as lifting links 20 (FIGS. 1 through 40 and 21 (FIG. 5) pivotally connected to the automotive vehicle 10 and pivotally connected relative to the elongate member 4) for raising and lowering the same relative to the atuomotive vehicle 10. The mounting means also includes tipping linkage means such as pivoting links 22 (FIGS. 1 through 3) and 23 (FIG. 5) and drag links 26 (FIGS. 1 through 3) and 27 (FIG. 5) which together are pivotally connected to the lifting links 20, 21 and pivotally connected relative to the elongate member 14 for pivoting the elongate member 14 relative to the lifting links 20, 21. Each of the sets of links has cooperating actuator means, such as hydraulic lifting cylinders 28, 29 and hydraulic tipping cylinders 30, 31 for respectively pivoting the lifting link means and the tipping linkage means independently of pivotal movement of the other of those means. By such independent movement, the elongate member 14 may be moved to and from an upright position (FIGS. 1 and 2) a forwardly tipped position (FIG. 3), a horizontal position overlying a tree stem disposed on the ground (not shown) and a horizontal position overlying a tree stem held slightly above the ground (FIG. 5).

As will be brought out more fully hereinafter, the encircling means 15 are mounted on the elongate member 14 for movement longitudinally thereof (as indicated by full and phantom lines in FIG. 5 and as will be noted by comparison to FIGS. 1 and 2). Such movement preferably is accomplished by means of a hydraulic cylinder device 35 operatively connected to a carriage means mounting the encircling means 15 and to structure near the lower extremity of the elongate member 14. The encircling means 15 include first and second jaw members 36, 38, each pivotable about a corresponding axis 39, 40 and moved by a corresponding hydraulic cylinder device 41, 42 (FIGS. 5 and 6). Movement of the jaw members 36, 38 cooperpates with a stationary guide portion 44 to encircle and controllably grip a tree stem S (compare the full and phatom line positions of FIG. 6). As is known, each of the jaw members 36, 38 and the stationary guide 44 is provided with sharpened edges in a direction of movement upwardly along a tree stem, so that the encircling means function as a delimber for removing limbs from a tree during operation of the apparatus as described more fully hereinafter.

The cutting instrumentalities 16 preferably are in the form of a shear having opposing pivoted shear blades 45, 46 and corresponding hydraulic fluid cylinder actuator devices 48, 49 (FIGS. 5 and 7). Elements of the shear may be constructed as shown in Allen U.S. Pat. No. 3,640,322 issued Feb. 8, 1972, and accordingly will not be described further in detail here.

As will be apparent, pressurized hydraulic fluid for operating the various hydraulic pressure cylinder devices described hereinabove may be derived from the hydraulic system of the automotive vehicle 10 and controlled by appropriate valves (not shown) in order to provide an operator with full control over the functions of the apparatus of this invention.

It is contemplated that the apparatus of this invention may be operated either to harvest and process growing trees or to process previously felled trees. With regard to the harvesting and processing of growing trees, the elongate member 14 is positioned upright and adjacent to the stem of a growing tree (FIG. 1). The stem S of the growing tree is then encircled intermediate its height with the encircling means 15 and the encircling means are moved upwardly along the stem of the tree (FIG. 2) to delimb a portion of the stem. Then, while maintaining encirclement of the stem, the cutting instrumentalities are operated to sever the growing tree and encirclement of the stem is maintained while the member 14 and the stem S are tipped forwardly away from the automotive vehicle 10 (FIG. 3). The member and stem are then moved to a position in which the member overlies the stem (FIG. 5) so that a portion of the stem adjacent the cutting instrumentalities is biased upwardly into engagement with the guide 18 by exertion of leverage about a fulcrum defined by the encircling means.

A previously felled tree stem may also be brought to this position by positioning the elongate member 14 adjacent the stem on the ground, encircling the stem with the encircling means 15, and then lifting the stem.

The present invention contemplates that a stem disposed horizontally and engaged by elements of the apparatus of this invention may be processed either into shortwood sticks or into longwood. In instances where the desired product is shortwood sticks of selected length, the stem is intermittently advanced toward the cutting instrumentalities 16 and the encircling means 15 are moved alternately toward and away from the cutting instrumentalities 16 while alternately gripping the stem and removing limbs therefrom. In particular, the stem is gripped with the encircling means 15 during movement thereof toward the cutting instrumentalities 16, to advance a delimbed portion of the stem through the cutting instrumentalities 16. The stem is then gripped with the cutting instrumentalities while the encircling means 15 are moved away from the cutting instrumentalities along the elongate member 14 and the encircled stem S, with the sharpened leading edges thereof removing limbs from a portion of the stem. At the conclusion of a stroke of the encircling means 15 away from the cutting instrumentalities 16, the stem is again gripped by the encircling means and the cutting instrumentalities are operated to sever a shortwood stick (FIG. 5).

It is to be noted that this operation is performed within full view of an operator seated on the operator's seat 11, thereby providing the opportunity for continuous observation by the operator of the processing of a tree stem. Thus, the operator may gauge the length of the shortwood sticks being formed and control the advancement and severing of the stem. It should further be noted that limbs removed from the stem by the encircling means 15 are dropped at a point spaced forwardly of the automotive vehicle 10 and are not dropped on the operator of the vehicle. Instead, limbs are piled at one location while severed shortwood sticks are piled at another location. This operation facilitates use of other known logging equipment to gather the shortwood sticks.

Where a stem is to be processed for longwood, it is preferred that the horizontal disposition of the stem be such that the stem is advanced beneath the automotive vehicle 10. With such positioning, the stem is alternately gripped with the encircling means 15 and the cutting instrumentalities 16 but the stem is not severed until such time as the diameter of an upper extremity of the stem has reached a lower limit selected for the longwood being processed.

In the drawings and specification there has been set forth a preferred embodiment of this invention and, although specific terms are employed, they are used in a generic and descriptive sense only and not for purposes of limitation.

That which is claimed is:

1. A method of processing trees comprising positioning an elongate member adjacent the stem of a tree, encircling the stem intermediate the height thereof with instrumentalities mounted on the member, maintaining encirclement of the stem while moving the member and the stem to a position in which the member overlies the stem, then supporting the stem as the arm of a first class lever while biasing a lower portion of the stem spaced from the encircling instrumentalities upwardly into engagement with an overlying guide mounted on the member by exerting with the upper portion of the stem leverage about a fulcrum defined by the encircling instrumentalities, and then moving the encircling instrumentalities along the member alternately toward and away from cutting instrumentalities mounted on the member adjacent the overlying guide while alternately gripping the stem and removing limbs therefrom with the encircling instrumentalities and intermittently advancing the stem toward the cutting instrumentalities while maintaining upward biasing of the stem into engagement with the overlying guide.

2. A method according to claim 1 wherein the positioning of the member adjacent the stem of a tree comprises positioning the member upright adjacent a growing tree and further comprising severing the butt of the encircled stem with the cutting instrumentalities and then moving the member and the stem from the upright position to the overlying position.

3. A method according to claim 1 wherein the positioning of the member adjacent the stem of a tree comprises positioning the member horizontally adjacent the severed stem of a previously felled tree and thereafter lifting the encircled stem to the position in which the member overlies the stem.

4. A method according to claim 1 further comprising severing shortwood sticks of selected length from the stem during intermittent advancement thereof toward the cutting instrumentalities.

5. A method according to claim 1 further comprising alternately gripping the stem with the encircling instrumentalities and with the cutting instrumentalities during intermittent advancement of the stem toward the cutting instrumentalities and passing substantially the entire length of the stem through the cutting instrumentalities as unsevered longwood.

6. A method of processing trees comprising positioning an elongate member which is supported from and forwardly of an automotive vehicle adjacent and overlying the stem of a tree, encircling the stem with a delimber mounted on the member, then maintaining encirclement of the severed stem and supporting the stem as the arm of a first class lever while biasing a lower portion of the stem spaced from the delimber upwardly into engagement with an overlying guide mounted on the member by exerting with the upper portion of the stem leverage about a fulcrum defined by the delimber, and then moving the delimber along the member alternately toward and away from a shear mounted on the member and intermittently advancing the stem toward the shear while severing shortwood sticks of selected length from the stem and removing limbs from the encircled stem and while maintaining upward biasing of the stem into engagement with the overlying guide.

7. A method of processing trees comprising positioning an elongate member which is supported from and forwardly of an automotive vehicle adjacent and overlying the stem of a tree, encircling the stem with a delimber mounted on the member, then maintaining encirclement of the stem and supporting the stem as the arm of a first class lever while biasing a lower portion of the stem spaced from the delimber upwardly into engagement with an overlying guide mounted on the member by exerting with the upper portion of the stem leverage about a fulcrum defined by the delimber, and then alternately gripping the stem with the delimber and with a shear mounted on the member while moving the delimber alternately toward and away from the shear and intermittently advancing the stem toward the shear and passing substantially the entire length of the stem through the shear as unsevered longwood while removing limbs from the encircled stem.

8. A method of harvesting trees as shortwood sticks comprising positioning an elongate member supported forwardly of an automotive vehicle in an upright position adjacent the stem of a tree, then encircling the stem at a location below limbs therefrom with a delimber mounted on the elongate member, moving the delimber upwardly along the elongate member and encircled stem and removing limbs from a portion of the stem, shearing the stem with a shear mounted adjacent a lower end of the elongate member, tipping the upper end of the severed stem away from the vehicle while moving the elongate member and the severed stem to a position in which the elongate member overlies the severed stem and while maintaining the delimber encircling the stem, then biasing the portion of the stem adjacent the shear upwardly into engagement with an overlying guide mounted on the elongate member intermediate the shear and delimber by exerting with the upper portion of the stem leverage about a fulcrum defined by the delimber, then gripping the stem with the delimber while moving the delimber along the elongate member toward the shear and advancing a delimber portion of the stem through the shear, then gripping with the shear a portion of the stem which extends therethrough while moving the delimber away from the shear along the elongate member and encircled stem and removing limbs from a further portion of the stem, then shearing a shortwood stick from the stem, and repeating movement of the delimber toward and away from the shear and alternate shearing of shortwood sticks and gripping of the stem by the delimber and shear so that limbs removed from the stem drop at a spaced location forwardly of the vehicle while shortwood sticks are dropped into a pile immediately in front of the vehicle.

9. A method of harvesting trees as longwood comprising positioning an elongate member supported forwardly of an automotive vehicle in an upright position adjacent the stem of a tree, then encircling the stem at a location below limbs therefrom with a delimber mounted on the elongate member, moving the delimber upwardly along the elongate member and encircled stem and removing limbs from a portion of the stem, shearing the stem with a shear mounted adjacent a lower end of the elongate member, tipping the upper end of the severed stem away from the vehicle while moving the elongate member and the severed stem to a position in which the elongate member overlies the severed stem and while maintaining the delimber encircling the stem, then biasing the portion of the stem adjacent the shear upwardly into engagement with an overlying guide mounted on the elongate member intermediate the shear and delimber by exerting with the upper portion of the stem leverage about a fulcrum defined by the delimber, then gripping the stem with the delimber while moving the delimber along the elongate member toward the shear and advancing a delimber portion of the stem through the shear, then gripping with the shear a portion of the stem which extends therethrough while moving the delimber away from the shear along the elongate member and encircled stem and removing limbs from a further portion of the stem, and repeating movement of the delimber toward and away from the shear and alternate gripping of the stem by the delimber and shear while advancing the delimber stem beneath the vehicle so that limbs removed from the stem drop forwardly of the vehicle while the delimber stem is deposited on the ground.

10. In a tree harvester including an automotive vehicle, an elongate member, shear means mounted on said elongate member for severing tree stems, carriage means mounted on said elongate member for movement therealong toward and away from said shear means, and delimber means mounted on said carriage means for encircling tree stems and for alternately removing limbs from an encircled stem during movement of said carriage toward said shear means, the improvement comprising mounting means for supporting said elongate member from and forwardly of said automotive vehicle and for moving said elongate member relative to said automotive vehicle to and from an upright position during encirclement and severing of a tree stem and a forwardly tipped position during handling of a severed tree stem, and guide means mounted from said elongate member intermediate said shear means and said delimber means for engaging a stem during handling thereof, said delimber means encircling a stem intermedite the height thereof while said mounting means maintains said elongate member in the upright position and defining a fulcrum about which the stem acts as a first class lever upon said mounting means moving said elongate member to the tipped position and into overlying relation to the stem so that the weight of an upper portion of the stem biases a portion of the stem adjacent the shear means into engagement with said guide means.

11. Apparatus according to claim 10 wherein said mounting means comprises lifting link means pivotally connected to said automotive vehicle and pivotally connected to said elongate member for raising and lowering the same relative to said automotive vehicle and tipping linkage means pivotally connected to said lifting link means and pivotally connected to said elongate member for pivoting the same relative to said lifting link means.

12. Apparatus according to claim 11 wherein said mounting means further comprises lifting actuator means for pivoting said lifting link means relative to said automotive means and tipping actuator means for pivoting said tipping linkage means relative to said lifting link means independently of pivotal movement thereof relative to said automotive vehicle.

13. In a tree processor including an automotive vehicle having an operator's seat disposed medially of the width thereof, an elongate member, cutting means mounted on said elongate member in substantial longitudinal alignment therewith for severing tree stems, and stem encircling means mounted on said elongate member in spaced relation to said cutting means for encircling tree stems, the improvement comprising mounting means for supporting said elongate member from and forwardly of said automotive vehicle and for moving said elongate member relative to said automotive vehicle to and from an overlying position during handling of a severed tree stem, said mounting means including linkage means spaced widthwise one from another and straddling said seat and said cutting instrumentalities for accommodating direct observation of said cutting instrumentalities by an operator seated in said seat, and guide means mounted on said elongate member intermediate said cutting means and said encircling means for engaging a severed tree stem during handling thereof, said stem encircling means encircling a tree stem intermediate the height thereof and defining a fulcrum about which the stem acts as a first class lever while said mounting means maintains said elongate member in the overlying position so that the weight of an upper portion of the stem biases a portion of the stem adjacent the cutting means upwardly into engagement with said guide means while the same are in said overlying position.

14. In a tree processor including an automotive vehicle, an elongate member, cutting means mounted on said elongate member for severing tree stems, and stem encircling means mounted on said elongate member in spaced relation to said cutting means for encircling tree stems, the improvement comprising mounting means for supporting said elongate member from and forwardly of said automotive vehicle and for moving said elongate member relative to said automotive vehicle to and from an overlying position during handling of a severed tree stem and for positioning a severed tree stem for passage thereof beneath said automotive vehicle, said mounting means moving said elongate member to a generally horizontal position substantially parallel to the ground upon moving said elongate member to said overlying position, and guide means mounted on said elongate member intermediate said cutting means and said encircling means for engaging a severed tree stem during handling thereof, said stem encircling means encircling a tree stem intermediate the height thereof and defining a fulcrum about which the stem acts as a first class lever while said mounting means maintains said elongate member in the overlying position so that the weight of an upper portion of the stem biases a portion of the stem adjacent the cutting means upwardly into engagement with said guide means while the same are in said overlying position, said stem encircling means and said guide means cooperating for positioning a stem substantially parallel to said elongate member.

* * * * *

UNITED STATES PATENT AND TRADEMARK OFFICE
CERTIFICATE OF CORRECTION

PATENT NO. : 3,999,582
DATED : December 28, 1976
INVENTOR(S) : Charles A. Allen, Walter Jarck It is certified that error appears in the above-identified patent and that said Letters Patent are hereby corrected as shown below:

Column 3, Line 34 after "(FIGS. 1 through" delete "40" - and insert therefor - 4;

Column 3, Line 37 after "gate member" delete "4" - and insert therefor - 14

Column 7, Line 40 delete "limber" - and insert therefor - limbed;

Column 7, Line 48 delete "delimber" - and insert therefor - delimbed;

Column 7, Line 50 delete "delimber" - and insert therefor - delimbed --

Signed and Sealed this

Twenty-second Day of March 1977

[SEAL]

Attest:

RUTH C. MASON
*Attesting Officer*

C. MARSHALL DANN
*Commissioner of Patents and Trademarks*